United States Patent Office 3,503,873
Patented Mar. 31, 1970

3,503,873
PREPARATION OF HYDROCARBON CONVERSION CATALYSTS
Edward Michalko, Chicago, Ill., assignor to Universal Oil Products Company, Des Plaines, Ill., a corporation of Delaware
No Drawing. Filed Nov. 3, 1967, Ser. No. 680,314
Int. Cl. C10g *11/02;* B01i *11/40*
U.S. Cl. 208—120                                    19 Claims

ABSTRACT OF THE DISCLOSURE

A method of catalyst preparation. The catalyst is a crystalline aluminosilicate dispersed in a silica matrix. A finely divided crystalline alkali metal aluminosilicate is dispersed in a silica sol which is thereafter gelled, slurried with a solution comprising ammonium ions and spray-dried.

Background of the invention

For many years petroleum hydrocarbon feed stocks boiling in the range above about 400° F. have been converted to lower boiling hydrocarbons in the motor fuel boiling range by heating them at a temperature of from about 600° F. to about 1100° F. in contact with an amorphous silica-alumina cracking catalyst. While other similar composites, e.g., silica-zirconia, silica-magnesia etc., have been known to catalyze said cracking, a silica-alumina composite has been by far the most widely accepted catalyst in the industry. More recently, improved catalysts have been prepared by the inclusion of a finely divided zeolite, or crystalline alumino-silicate, either naturally occurring or synthetically prepared, within the silica-alumina matrix. Prior inventors have prepared, tested and compared hydrocarbon conversion catalysts comprising a finely divided crystalline alumino-silicate distributed throughout an amorphous silica matrix on the one hand, and throughout an amorphous silica-alumina matrix on the other hand. The general conclusion has been that the amorphous silica-alumina matrix affords a superior cracking catalyst. It has been discovered that the amorphous silica matrix is in fact superior to the amorphous silica-alumina matrix in this respect provided that the catalyst is prepared in the manner hereinafter described. That this is totally unexpected in the art is evidenced by the fact that in spite of the comparatively low cost of silica the industry has turned almost exclusively to silica-alumina. Thus, by the method of this invention, a cracking catalyst is manufactured at a considerable reduction in cost, said catalyst resulting in higher conversion to gasoline in the catalytic cracking process and lower coke yields to effect a more economical hydrocarbon conversion process.

Summary of the invention

In one of its broad aspects, the present invention embodies a method of preparing a catalyst composite comprising a crystalline aluminosilicate dispersed in a silica matrix which comprises forming a homogenized slurry comprising a finely divided crystalline alkali metal aluminosilicate and water, admixing said slurry with an acidic silica hydrosol at a pH of from about 4.0 to about 4.5 and effecting gelation, slurrying the resulting gelation product with a solution comprising ammonium ions sufficient to base-exchange at least about 0.1 equivalent of alkali metal cations associated with the crystalline akali metal aluminosilicate, the ammonium ion precursor being employed in a concentration precluding the formation of acidic by-products selected from the group consisting of strong mineral acids and acid salts thereof, and separating and drying the resulting base-exchanged product.

In accordance with the method of this invention a finely divided crystalline alkali metal aluminosilicate is initially dispersed in aqueous media and formed into a homogenized slurry. While the method of this invention is operable to manufacture catalysts comprising the general class of crystalline aluminosilicates, e.g., mordenite, faujasite, etc., dispersed in a silica matrix the method is of particular advantage in the manufacture of catalysts comprising a faujasite dispersed in a silica matrix and the subsequent description of the invention is presented with respect thereto. The alkali metal aluminosilicate, usually the sodium form, utilized pursuant to the method of the present invention can be a naturally occurring faujasite. However, as a practical matter, a synthetically prepared faujasite is preferred. The faujasites herein contemplated have been defined in the literature and do not warrant an extensive description here. Briefly, the faujasite is a zeolite, or crystalline aluminosilicate, of three dimensional structure, the crystalline form being often described as a truncated octahedra with pore openings in the range of from about 6 to about 15 angstroms. The faujasites can be represented in terms of mole ratios of oxides in the following manner:

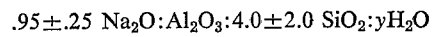

wherein $y$ is a number up to about 8. It is preferred to utilize a faujasite characterized by a silica-alumina ratio of at least about 3, for example, a faujasite represented in terms of mole ratios of oxides as follows:

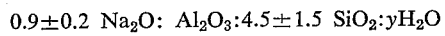

The synthetic crystalline aluminosilicates are commercially available, or they may be prepared in any conventional or otherwise convenient manner. For example, one preferred method of preparation comprises forming an aqueous solution of sodium aluminate and sodium hydroxide and a reactive amorphous silica. Suitably, the amorphous silica reactant may be fume silica, chemically precipitated silica, a precipitated silica sol, and such silicas as are described by the trade names "Hi-Sil," "Cab-o-sil," and the like. The resulting reaction mixture preferably comprises a molar ratio of $Na_2O$ to $SiO_2$ of at least about 0.3 and generally not in excess of about 0.8. Sodium aluminate comprising a molar ratio of $Na_2O$ to $Al_2O_3$ of about 1.5 is suitably employed as a reactant. The selected silica source and the sodium aluminate solution are employed in amounts such that the mole ratio of silica to alumina in the reaction mixture is from about 6 to about 20. Thus, the reaction mixture preferably has a composition which may be expressed as a mixture of oxides as follows: $SiO_2$ to $Al_2O_3$ in a molar ratio of from about 6 to about 20, $Na_2O$ to $SiO_2$ in a molar ratio of from about 0.3 to about 0.8 and $H_2O$ to $Na_2O$ in a molar ratio of from about 35 to about 60. In any case the reaction mixture is heated, usually at a temperature of about 212° F., in a closed vessel to avoid water loss. The crystalline aluminosilicate reaction product which precipitates from the hot reaction mixture is separated and water washed until the water in equilibrium with the crystals attains a pH of from about 9 to about 12.

The finely divided faujasite dispersed in aqueous media is thoroughly homogenized before admixing the same with an acidic silica hydrosol in the manner hereinafter described. The faujasite is suitably homogenized in water in a concentration and to the extent that there is essentially no setting of the faujasite for a period of at least about 10 minutes subsequent to the homogenizing process. While the concentration of the faujasite in the aqueous media is not considered critical, a faujasite/water weight ratio of about 1/5 has produced a suitable homogenized slurry upon thorough and adequate mixing.

The finely divided faujasite thus homogenized is admixed with an acidic silica hydrosol in an amount to insure a final catalyst composite comprising from about 1.0 to about 50 weight percent faujasite dispersed in the amorphous silica matrix, preferably from about 1.0 to about 15 weight percent. In the practice of this invention, the homogenized faujasite slurry is admixed with an acidic silica hydrosol at a pH of from about 4.0 to about 4.5. The acidic silica hydrosol is obtainable by conventional methods of preparation including acidification of sodium silicate with a mineral acid, such as sulfuric or hydrochloric acid. The homogenized faujasite may be admixed with the acidic silica hydrosol in a manner whereby said faujasite is initially added to, for example, a sodium silicate solution and the resulting mixture acidified with sulfuric acid to establish the desired pH value of from about 4.0 to about 4.5. A preferred method comprises acidifying an aqueous sodium silicate solution with an aqueous sulfuric acid solution of a concentration sufficient to establish the desired pH of from about 4.0 to about 4.5, or, more preferably, a pH of from 4.2 to about 4.4, and thereafter admixing the faujasite slurry with the acidic silica hydrosol at a temperature of from about 70° F. to about 110° F., preferably at a temperature of from about 90° F. to about 100° F. A preferred method of establishing the desired temperature comprises initially adjusting the temperature of the aforementioned sodium silicate solution so that upon admixing the sulfuric acid solution therewith, the resulting acidified silica hydrosol temperature is in the desired range. Since gelation of the acidic silica hydrosol occurs within a matter of minutes, usually within from about 10 to about 15 minutes, at the described conditions, the faujasite should be admixed with the hydrosol without undue delay.

After a suitable period of time has elapsed during which the slurry is permitted to age at the acidic conditions, preferably under conditions of rapid and continuous stirring, whereby the silica is polymerized to a complex polysilicic acid, the slurry is adjusted to a pH of from about 5 to about 8, preferably a pH of from about 6 to about 7. The slurry is thereafter aged at said pH for a time sufficient to develop optimum pore structure of the silica hydrogel, a period of from about 0.5 to about 3 hours being suitable, a period of from about 0.5 to about 1.5 hours being preferred. The last mentioned aging step is conveniently referred to as a basic age in contrast to the first mentioned acid age.

It is understood that the gelation product may be treated with the hereinafter described solution comprising ammonium ions during the acid age step or during the basic age step. In the latter case, the ammonium ion concentration hereinafter prescribed for said solution will be over and above any ammonium ion concentration which may have been employed to adjust the pH of the reaction mixture for said basic age.

In the preferred instance, the basic aged gelation product is separated from the reaction mixture and slurried with the aforementioned solution comprising ammonium ions. This last mentioned solution should comprise sufficient ammonium ions to base-exchange at least about 0.1 equivalent of alkali metal cations associated with the crystalline alkali metal aluminosilicate contained in the slurry, any alkali metal associated with the residual portion of the slurry notwithstanding. It is considered essential that the ammonium ion procursor be employed under conditions precluding the formation of acidic by-products detrimental to the crystalline aluminosilicate. Thus, ammonium sulfate utilized in excess tends to form the acid salt, ammonium bisulfate and/or the strong acid, sulfuric acid, both of which are detrimental to the crystalline aluminosilicate. Therefore, when the ammonium precursor is an ammonium salt of a strong acid it is preferred to maintain the concentration thereof at a level to furnish ammonium ions sufficient to base-exchange from about 0.1 to about 1.0 and preferably from about 0.3 to about 0.9, equivalents of alkali metal cations associated with the crystalline alkali metal aluminosilicate contained in the slurry. On the other hand, ammonium acetate, being an ammonium salt of a weak acid, can be used in considerable excess without adversely affecting the crystalline aluminosilicate. Suitably, ammonium acetate, or other ammonium salt of a weak acid, is employed in a concentration to furnish ammonium ions sufficient to base-exchange from about 0.3 to about 2.5 equivalents of alkali metal cations associated with said crystalline alkali metal aluminosilicate.

The basic aged gelation product is preferably slurried with the aforesaid solution comprising ammonium ions to a smooth consistency suitable for spray-drying. Thus, the resulting base-exchanged product is suitably and advantageously separated and dried by spray-drying means whereby a rapid evaporation of moisture is effected and dried particles fall out of the spray. The spray-drying step comprises spraying the aqueous slurry in an atomized state into a tower of hot flowing gases. The hot flowing gases are injected into the tower at a temperature to effect a rapid evaporation of moisture so that dried particles of predetermined size range fall out of the spray. The hot flowing gases are suitably injected into the tower at conditions to effect an initial contact with the atomized spray at a temperature of from about 400° F. to about 1200° F. the temperature in the upper range, say from about 650° F. to about 1200° F., being preferred. Hot flue gases have been conveniently and advantageously employed.

After the spray-drying step, the dried material is preferably water-washed to separate water-soluble materials therefrom. The spray-dried material is further treated in contact with a solution comprising ammonium ions, suitably an aqueous ammonium salt solution, such as ammonium sulfate, to remove substantially all of the sodium or other alkali metal, and this last step may be combined with the aforementioned water wash or may be separate and apart therefrom.

The catalyst composite prepared in accordance with the method of this invention can be composited with any of the several catalytically active metallic materials in the oxidized or reduced state. In one preferred embodiment, the composite, substantially free of alkali metal, is further treated in contact with a solution, preferably an aqueous solution, comprising both rare earth cations and ions selected from the group consisting of hydrogen ions, hydrogen ion precursors, and mixtures thereof. The ratio of hydrogen ions, or ions capable of conversion to hydrogen ions, to rare earth metal ions is not considered critical and may vary over a relatively wide range. A particularly suitable solution is one containing rare earth metal ions and hydrogen ions, or ions capable of conversion to hydrogen ions, in a ratio of from about 10/1 to about 1/1 whereby a base-exchange reaction is effected to yield a composite which comprises aluminum and rare earth metals in a ratio of from about 3/1 to about 6/1. Organic and inorganic acids are generally considered as a convenient source of hydrogen ions. However, it is preferred to utilize a hydrogen ion precursor, particularly an ammonium salt such as ammonium chloride, which is decomposable to provide hydrogen ions at a temperature below the decomposition temperature of the faujasite. Other suitable ammonium salts include ammonium bromide, ammonium iodide, ammonium sulfate, ammonium benzoate, ammonium borate, ammonium citrate, etc.

The rare earth metals include cerium, lanthanum, praseodymium, neodymium, illinium, samarium, europium, gadolinium, terbium, dysprosium, holmium, erbium, thulium, scandium, yttrium, and lutecium. A wide variety of rare earth compounds can be employed with facility as a source of rare earth metal ions. Suitable compounds include rare earth chlorides, bromides, iodides, sulfates, acetates, benzoates, citrates, nitrates, and the like. The preferred rare earth salts are the chlorides, nitrates and sulfates. The rare earth metal salts employed can either be the salt of a single rare earth metal or, as is usually the case, mixtures of rare earth metals such as rare earth metal chlorides of didymium chlorides. It is contemplated that the product thus treated comprises rare earth cations chemisorbed or ionically bonded to the faujasite, although it may very well be that at least a portion of said cations may be so sorbed or bonded to the amorphous silica component of the catalyst composite. Anions introduced to the composite as a consequence of the base-exchange treatment are suitably separated by water-washing one or more times until free of said ions. The composite is thereafter dried, generally in an air atmosphere, an elevated temperature of from about 150° F. to about 600° F. being suitable. The catalysts thus prepared are particularly effective in the cracking of hydrocarbon feed stocks, such as occur in the gas-oil range of petroleum hydrocarbons, to form lower boiling hydrocarbons in the motor fuel range at catalytic cracking conditions generally described in the art. In particular, a temperature of from about 700° F. to about 1200° F. may be employed and the pressure may range from subatmospheric to several atmospheres. The cracking process can be effected by any of the well-known techniques including a fixed bed type of operation, a moving bed type of operation, and, in particular, the well-known fluidized bed type of operation.

Also of interest are those catalysts comprising one or more metals of Group VI–B and VIII including molybdenum, tungsten, chromium, iron, nickel, cobalt, platinum, palladium, ruthenium, rhodium, osmium and iridium. Thus, the catalyst composite prepared in accordance with the process of this invention can be utilized advantageously as a catalyst, or as a component thereof, to effect a variety of hydrocarbon conversion reactions involving reacting conditions comprising a temperature in the 70–1400° F. range. The catalyst composite of this invention is particularly useful in combination with a hydrogenation component such as nickel together with molybdenum, tungsten, etc., in effecting the hydrocracking of heavy oils, including vacuum residuals, in the presence of hydrogen to form petroleum products in the middle distillate range utilizing a temperature of from about 500 p.s.i.g. to about 2500 p.s.i.g. Said hydrocarbon conversion reactions further include polymerization of olefins, particularly ethylene, propylene, 1-butene, 2-butene, iso-butylene, and also higher boiling olefins, at polymerization reaction conditions. The catalyst composite is also useful as a catalyst or a component thereof in effecting the alkylation of isoparaffins with olefins or other alkylating agents including, for example, alkyl halides and the like; and also for the alkylation of isobutane, isopentane and/or isohexane with ethylene, propylene, 1-butene, etc., or mixtures thereof; and also the alkylation of aromatics with olefins or other alkylating agents, particularly the alkylation of benzene, toluene, etc., with propylene, and higher boiling olefins including nonenes, decenes, undecenes, etc., the foregoing alkylation reactions being effected at alkylation conditions disclosed in the art. The catalyst products of the method of this invention are further helpful in the isomerization of paraffins, particularly n-butane, n-pentane, n-hexane, n-heptane, n-octane, etc., and also the isomerization of less highly branched chain saturated hydrocarbons such as the isomerization of 2- or 3-methylpentane to 2,3- and 2,2-dimethylbutane, isomerization of dimethylcyclohexane to methylcyclohexane, isomerization of methylcyclopentane to cyclohexane, etc., at isomerization reaction conditions. Other hydrocarbon conversion reactions including hydrogen transfer reactions, trans-alkylation reactions, and the reforming of gasoline or naphtha to improve the anti-knock characteristics thereof, are effectively catalyzed utilizing the catalyst composite prepared in accordance with the method of this invention as a catalyst or component thereof.

The following example is presented in illustration of the method of this invention and is not intended as an undue limitation on the generally broad scope of the invention as set out in the appended claims.

Example I

In the preparation of the faujasite to be included in an amorphous silica matrix as herein contemplated, 780 grams of sodium aluminate, containing 23.3 weight percent sodium and 44.6 weight percent $Al_2O_3$, and 1,994 grams of sodium hydroxide pellets were dissolved in 9,520 milliliters of distilled water. This solution was allowed to cool with stirring and then added to 9,500 milliliters of an aqueous colloidal silica sol containing 35 weight percent $SiO_2$. The resultant mixture was aged without stirring over a period of about 20 hours. The reaction vessel was then sealed and heated at 203° F. for a 48 hour period to effect crystallization of the faujasite product. Thereafter, the mother liquor was decanted from the crystalline product which was then washed with distilled water until the pH of the wash effluent was about 10.5. The product was dried at about 250° F.

Chemical analysis indicated a product composition as follows:

Percent volatile at 932° F.—24.7%
$Al_2O_3$—22.51%
$SiO_2$—64.35%
$Na_2O$—12.5% giving a high silica faujasite with a silica/alumina ratio of 4.86.

A portion of the faujasite thus prepared was incorporated in an amorphous silica matrix to the extent of 10 weight percent in the following manner. An acidic silica hydrosol was prepared initially by the addition of 24,200 milliliters of water glass (sodium silicate) solution, containing 6.9 weight percent $SiO_2$, to 3,000 milliliters of 25% sulfuric acid, the final pH being 4.2. To the resulting acidified silica hydrosol was added a homogenized faujasite prepared by the addition of 254 grams of dried faujasite including water of crystallization to one liter of water and homogenized by treatment in a blending apparatus for a period of about one minute. The pH of the resultant slurry was 4.3. Gelation occurred within about 10 minutes with stirring being continued for an additional 15 minutes. The pH was then adjusted to 5.5 by the addition of 130 cubic centimeters of the aforesaid water glass solution. After one hour of aging at said pH the solids were separated from the supernatant liquid, reslurried with about 100 grams of ammonium acetate in 25 liters of water and spray dried. The spray dried product was then washed 6 times, each with a 1500 milliliter solution containing 50 grams of ammonium chloride. Washing was accomplished at about 170° F. The product was further water-washed free of chloride ions. The washed product was thereafter soaked in a base-exchange solution comprising 8.5 grams of ammonium chloride and 43.0 milliliters of a mixed rare earth chloride solution (57.92% rare earth chloride hexahydrate) in 1,240 milliliters of water. Soaking was accomplished over a 2 hour period with occasional stirring at room temperature. The base-exchanged product was then recovered, water-washed free of chloride, air dried at 350° F. and calcined at 1112° F. The catalyst thus prepared was steam deactivated by passing 60% steam in air in contact with the catalyst at a temperature of 1400° F. for a period of 12 hours. The steam deactivated catalyst contained about 1.54 weight percent rare earth metals. The steam deactivated catalyst, evaluated by the method hereinafter described, effects a substantial gas oil conversion and exhibits high selectivity for gasoline. The catalyst is evaluated by the method whereby a gas oil boiling in the range of 530–995° F. is passed in contact with the catalyst at substantially atmospheric pressure at a feed rate of 4 weight hourly space velocity. Tests are run at a temperature of 900° F. to determine conversion of the gas oil to gasoline having an end point of 410° F. Each test comprises 5 cycles and each cycle consists of a processing period, a steam stripping period and an air regeneration period. The conversion at 900° F. is about 57 weight percent with 40.6 weight percent gasoline and about 5 weight percent coke make.

I claim as my invention:

1. A catalyst composite comprising a crystalline aluminosilicate dispersed in a silica matrix prepared by the method comprising:
   (a) forming a homogenized slurry comprising a finely divided crystalline alkali metal aluminosilicate and water,
   (b) admixing said slurry with an acidic silica hydrosol at a pH of from about 4.0 to about 4.5 and effecting gelation,
   (c) slurrying the resulting gelation product with a solution comprising ammonium ions sufficient to base-exchange at least about 0.1 equivalent of alkali metal cations associated with said crystalline alkali metal aluminosilicate, the concentration of the ammonium ion precursor being such as to preclude the formation of acidic by-products selected from the group consisting of strong mineral acids and acid salts thereof,
   (d) separating and drying the resulting base-exchanged product.

2. The catalyst composite of claim 1 further characterized with respect to step (b) in that the reaction mixture comprising the gelation product is adjusted to a pH of from about 5 to about 8 and aged at said pH for a period of at least about 0.5 hours.

3. The catalyst composite of claim 2 further characterized with respect to step (c) in that said gelation product is separated from said reaction mixture prior to slurrying said product with said solution comprising ammonium ions.

4. The catalyst composite of claim 3 further characterized with respect to step (d) in that said base-exchanged product is separated and dried by spray-drying means whereby a rapid evaporation of moisture is effected and dried particles fall out of the spray.

5. The catalyst composite of claim 4 further characterized with respect to step (d) in that the base-exchanged product thus separated and dried is further treated in contact wih a solution comprising ammonium ions whereby the total alkali metal content is reduced to less than about 1 weight percent thereof.

6. The catalyst composite of claim 5 further characterized with respect to step (a) in that said crystalline alkali metal aluminosilicate is a faujasite.

7. The catalyst composite of claim 6 further characterized with respect to step (a) in that said faujasite has a composition expressed in terms of oxide mole ratios as follows:

$$0.9 \pm 0.2 \ Na_2O:Al_2O_3:4.5 \pm 1.5 \ SiO_2:yH_2O$$

where $y$ is a number up to about 8.

8. The catalyst composite of claim 7 further characterized with respect to step (b) in that said acidic silica hydrosol is prepared by admixing sodium silicate and aqueous sulfuric acid with a resultant pH of from about 4.2 to about 4.4, and further characterized in that said gelation is effected at a temperature of from about 90° F. to about 100° F.

9. The catalyst composite of claim 8 further characterized with respect to step (b) in that said reaction mixture comprising said gelation product is adjusted to a pH of from about 6 to about 7 and aged at said pH for a period of from about 0.5 to about 1.5 hours.

10. The catalyst composite of claim 9 further characterized with respect to step (c) in that the aged material is slurried with an ammonium sulfate solution comprising ammonium ions sufficient to base-exchange from about 0.3 to about 0.9 equivalents of sodium cations associated with said faujasite.

11. The catalyst composite of claim 9 further characterized with respect to step (c) in that the aged material is slurried with an ammonium acetate solution comprising ammonium ions sufficient to base-exchange from about 0.3 to about 2.5 equivalents of sodium cations associated with said faujasite.

12. The catalyst composite of claim 10 further characterized with respect to step (d) in that the slurry is spray dried at an inlet temperature of from about 650° F. to about 1200° F.

13. The catalyst composite of claim 11 further characterized with respect to step (d) in that the slurry is spray dried at an inlet temperature of from about 650° F. to about 1200° F.

14. The catalyst composite of claim 12 further characterized with respect to step (d) in that said total sodium content is reduced to less than about 0.2 weight percent thereof.

15. The catalyst composite of claim 13 further characterized with respect to step (d) in that said total sodium content is reduced to less than about 0.2 weight percent thereof.

16. The catalyst composite of claim 14 further characterized in that step (d) further comprises base-exchanging the substantially sodium free material in contact with a solution comprising rare earth metal cations whereby the final catalyst composites comprises aluminum and rare earth metals in a ratio of from about 3:1 to about 6:1.

17. The catalyst composite of claim 6 further characterized in that step (d) further comprises base-exchanging the substantially sodium free material in contact with a solution comprising rare earth metal cations whereby the final catalyst composites comprises aluminum and rare earth metals in a ratio of from about 3:1 to about 6:1.

18. A process for cracking a hydrocarbon charge stock which comprises contacting said charge stock with the catalyst of claim 1 at cracking conditions.

19. A process for cracking a hydrocarbon charge stock which comprises contacting said charge stock with the catalyst of claim 17 at cracking conditions.

References Cited

UNITED STATES PATENTS

| | | | |
|---|---|---|---|
| 3,140,253 | 7/1964 | Plank et al. | 208—120 |
| 3,344,086 | 9/1967 | Cramer et al. | 252—451 X |
| 3,352,796 | 11/1967 | Kimberlin et al. | 252—455 |

DANIEL E. WYMAN, Primary Examiner

CARL F. DEES, Assistant Examiner

U.S. Cl. X.R.

252—451, 455